US006397166B1

(12) United States Patent
Leung et al.

(10) Patent No.: US 6,397,166 B1
(45) Date of Patent: May 28, 2002

(54) METHOD AND SYSTEM FOR MODEL-BASED CLUSTERING AND SIGNAL-BEARING MEDIUM FOR STORING PROGRAM OF SAME

(75) Inventors: Ying Tat Leung, Tarrytown; Menachem Levanoni, Yorktown Heights; Sanjay E. Ramaswamy, Scarsdale, all of NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/187,406

(22) Filed: Nov. 6, 1998

(51) Int. Cl.[7] .................. G06F 101/14; G06F 15/00; G06F 17/18
(52) U.S. Cl. .......................... 702/179; 705/10
(58) Field of Search .................. 702/179, 181; 705/7, 10, 30; 703/2; 707/7, 3, 6

(56) References Cited

U.S. PATENT DOCUMENTS

| | | | | | |
|---|---|---|---|---|---|
| 6,012,058 A | * | 1/2000 | Fayyad et al. | ............... | 707/6 |
| 6,021,383 A | * | 2/2000 | Domany et al. | ............ | 702/181 |
| 6,092,072 A | * | 7/2000 | Guha et al. | ............... | 707/101 |
| 6,100,901 A | * | 8/2000 | Mohda et al. | ............... | 345/440 |
| 6,115,708 A | * | 9/2000 | Fayyad et al. | .............. | 707/6 |
| 6,122,628 A | * | 9/2000 | Castelli et al. | .............. | 707/5 |
| 6,236,985 B1 | * | 5/2001 | Aggarwal et al. | ........... | 707/2 |
| 6,263,334 B1 | * | 7/2001 | Fayyad et al. | ............... | 707/5 |
| 6,263,337 B1 | * | 7/2001 | Fayyad et al. | ............... | 707/6 |

OTHER PUBLICATIONS

Banfield, et. al., "Model–Based Gaussian and Non–Gaussian Clustering", Biometrics 49, pp. 803–821, Sep. 1993.

* cited by examiner

Primary Examiner—Patrick Assouad
(74) Attorney, Agent, or Firm—Stephen C. Kaufman, Esq.; McGinn & Gibb, PLLC

(57) ABSTRACT

A method and system for grouping multiple data points, each data point being a set (e.g., a vector, a tuple, etc.) including a measured dependent value and at least one related independent variable value, include fitting the data into a model relating the independent and dependent variables of the data, and calculating similarity and distance between the data points and groups of the data points, thereby to group the multiple data points.

31 Claims, 5 Drawing Sheets

METHOD AND SYSTEM FOR MODEL-BASED CLUSTERING AND SIGNAL-BEARING MEDIUM FOR STORING PROGRAM OF SAME

BACKGROUND OF THE INVENTION

1. Field of the Invention

The present invention generally relates to a computer-implemented method for clustering retail sales data, and more particularly to a method which assumes a model of retail demand as a function, for example, of the price, base sales rate, and seasonal factors, and clusters together items that have, for example, the same seasonal and price effect factors based on the model fit.

2. Description of the Related Art

Conventional systems utilize clustering for the construction of a classification scheme over a set of objects such that objects within classes are similar in some respects but are different from those in other classes.

The basic data for cluster analysis is a set of N entities for each of which p attribute values have been observed (e.g., N retail items for each of which the last 52 weeks of sales has been observed). The major features of cluster analysis include:

Choice of variables—This feature deals with determining which attributes of the elements to be clustered will be considered.

Measurement of similarity or distance—Most clustering techniques begin with a calculation of a matrix of similarities or distances between the entities to determine their "closeness" for clustering. Additionally, a measure of similarity should be definable between groups. Some typical choices are Euclidean distance, city block distance, Minkowski distance, and similarity coefficients based on the Pearson or Spearman correlation coefficients, as discussed for example in Kaufman et al., "Finding Groups in Data-An Introduction to Cluster Analysis", John Wiley & Sons, 1990.

Generation of clusters—All clustering techniques attempt to partition the data set into a set of clusters such that individuals in a cluster have high similarity to one another and differ from those in other clusters. Similarity is defined quantitatively as discussed above. A number of techniques exist for clustering and differ in the approaches used for initiating clusters, searching through the solution space for target clusters, and the termination criterion. Some known clustering techniques relevant to the present invention include:

Hierarchical clustering: Given n objects, hierarchical clustering consists of a series of clustering from the initial situation when each object may be considered a singleton cluster to the other extreme where all objects belong to one cluster. Hierarchical techniques may be subdivided into agglomerative methods which proceed by a series of successive fusions of the n objects into groups, and divisive methods which partition the set of n entities successively into finer partitions.

Optimization techniques: Optimization techniques attempt to form an optimal k-partition over the given set of objects (i.e., divide the set of entities into k mutually exclusive clusters) to optimize a pre-defined objective function, where k is usually input by the user. The pre-defined objective function is usually a measure for maximizing similarity within the cluster and the distance between clusters. The techniques employed differ in the methods by which an initial partition of the data is obtained, and the method for iteratively searching for the optimal partition.

Other techniques include density search, fuzzy clustering, neural networks, and conceptual clustering, as described, for example, in B. Everitt, "Cluster Analysis", Third Edition, Edward Arnold, 1993.

The term model-based clustering has also been used in another context, as described in Banfield et al., "Model-Based Gaussian and Non-Gaussian Clustering", *Biometrics*, 49, 803–822, 1993. This approach assumes a probability model for the population of interest and a density function for the observations.

In practical applications, among the popular methods for clustering are hierarchical- and optimization-based techniques, as mentioned above, which can be used to cluster retail sales data based on differences in the time series. Other applications of clustering can be found in a range of areas from finance (e.g., clustering stock price movement data) to the social sciences (e.g., clustering data on people's responses and preferences).

However, currently available methods for clustering do not assume a model relating the independent and dependent variables, and are hence, for example, in a retail environment, restricted to grouping only on the basis of observed sales data. Therefore, separating items on the basis of price effects etc. on demand is impossible.

For example, consider the sales of two items (e.g., sales1 and sales2) shown in FIG. 5A. Looking only at the sales data, they appear similar in sales pattern over time (e.g., weeks, months, etc.), and as such, the items would be assumed to exhibit similar seasonal behavior. However, when other factors are also considered (e.g., such as price in FIG. 5B), and a model relating the sales to the price is assumed, then differing seasonal patterns and differing price sensitivities may be shown (e.g., see FIG. 5C). The conventional techniques do not provide for such consideration of other such variables. Instead, the conventional techniques factor only one variable.

Thus, conventional clustering techniques use only one stream of data (e.g., such as the sales data over time) and have no capability for factoring other data streams/variables, and thus may erroneously classify (e.g., cluster) items 1 and 2 as similar, when in fact the items are not similar.

SUMMARY OF THE INVENTION.

In view of the foregoing and other problems of the conventional methods and techniques, an object of the present invention is to provide a method for grouping of data sets (e.g., not restricted to retail sales data, but described below simply as an example) in cases where the data set includes an observed or dependent value, and one or more controllable or independent values, based on a model relating the independent and dependent variables.

In a first aspect, a method of grouping multiple data points, each data point being a set (e.g., a vector, a "tuple", etc.) comprising a measured dependent value and at least one related independent variable value, includes fitting the data into a model relating the independent and dependent variables of the data, and calculating a similarity and a distance between the data points and groups of the data points, thereby to group the multiple data points.

In a second aspect, a system for grouping multiple data points, each data point being a set (e.g., a vector, a "tuple", etc.) comprising a measured dependent value and at least one related independent variable value, includes means for fitting the data into a model relating the independent and dependent variables of the data, and means for calculating similarity and distance between the data points and groups of the data points, thereby to group the multiple data points.

In a third aspect, a signal-bearing medium is provided tangibly embodying a program of machine-readable instructions executable by a digital processing apparatus to perform a method for computer-implemented model-based clustering for grouping multiple data points, each data point being a set (e.g., a vector, a "tuple", etc.) comprising a measured dependent value and at least one related independent variable value, the program including fitting the data into a model relating the independent and dependent variables of the data, and calculating similarity and distance between the data points and groups of the data points, thereby to group the multiple data points.

In a fourth aspect, a method of model-based clustering, includes initializing clustering parameters for a plurality of items; reading-in an actual data set used for clustering, and reading cluster center seeds, and calculating an target number of clusters; incrementing an iteration counter; scoring each item in the data set against all the available cluster centers using a similarity measure process, wherein if a similarity measure value of the item being examined is greater than a minimum first parameter, no further search is performed for the item, and the item is assigned to a particular cluster, and when the similarity measure value is less than said minimum first parameter, the item is assigned to the cluster against which the item scores the highest; removing clusters having a predetermined low number of assigned items, the removed clusters including items which are unassigned; updating cluster centers for all the remaining clusters; calculating an overall average cluster score as the average of all the average cluster scores to determine an overall distance, an overall distance being recorded for each iteration performed; determining whether the iteration is an odd-numbered iteration, wherein if it is determined that the iteration is an odd numbered iteration and that the remaining number of clusters is less than twice the target number calculated, then for each cluster checking a splitting criterion; determining whether a cluster is a candidate for splitting based on whether 100−average cluster score>overall distance, and the cluster has more than twice the minimum number of items needed, wherein an item which scores the least by having a lowest similarity measure against the cluster center is used as a seed for a new cluster that is formed; and assigning all items to clusters using the similarity measure calculation.

The method according to the fourth aspect further includes determining whether the iteration is an even-numbered iteration, wherein for even-numbered iterations, joining of clusters is attempted, and each cluster is scored against the other using a process of finding the similarity between two clusters, and for each cluster a most similar cluster is found; checking the similarity measure against a parameter MINCOMBINE, wherein if the similarity score is higher, then that pair of clusters are combined into one cluster by using any one of the centers, and destroying the other cluster; assigning all items to clusters based on said similarity measure; checking the iteration number against a maximum iteration parameter, wherein if the iteration number is less than said maximum iteration parameter, the iteration number is incremented, and a sequence is repeated, and wherein if it is determined that the iteration is greater than the maximum iteration parameter, then the process terminates, wherein the iteration with the lowest overall distance is selected as the best, and the corresponding assignments of items to clusters, and the cluster scores and parameter estimates are used as the solution.

The method according to the present invention is especially useful in estimating demand model parameters and in decision-support related to price and promotion planning in the retail industry. Obviously, as would be known by one of ordinary skill in the art within the purview of this application, other applications and implementations are possible including clustering financial data where market prices, causal variables and a model form for the relationship is made available, or in the social sciences where quantitatively measurable responses are linked to controllable inputs and a model relating the variables is assumed.

As mentioned above, methods for clustering include hierarchical- and optimization-based techniques, which can be used to cluster retail sales data based on differences in the time series. The present invention allows usage of these methods to cluster data based on price sensitivity in addition to seasonal effects with reference to a given demand model.

As a result, the inventive method can reliably estimate demand model parameters and in decision-support related to price and promotion planning in the retail industry.

BRIEF DESCRIPTION OF THE DRAWINGS

The foregoing and other objects, aspects and advantages will be better understood from the following detailed description of a preferred embodiment of the invention with reference to the drawings, in which.

DETAILED DESCRIPTION OF PREFERRED EMBODIMENTS OF THE INVENTION

Figure 1A:
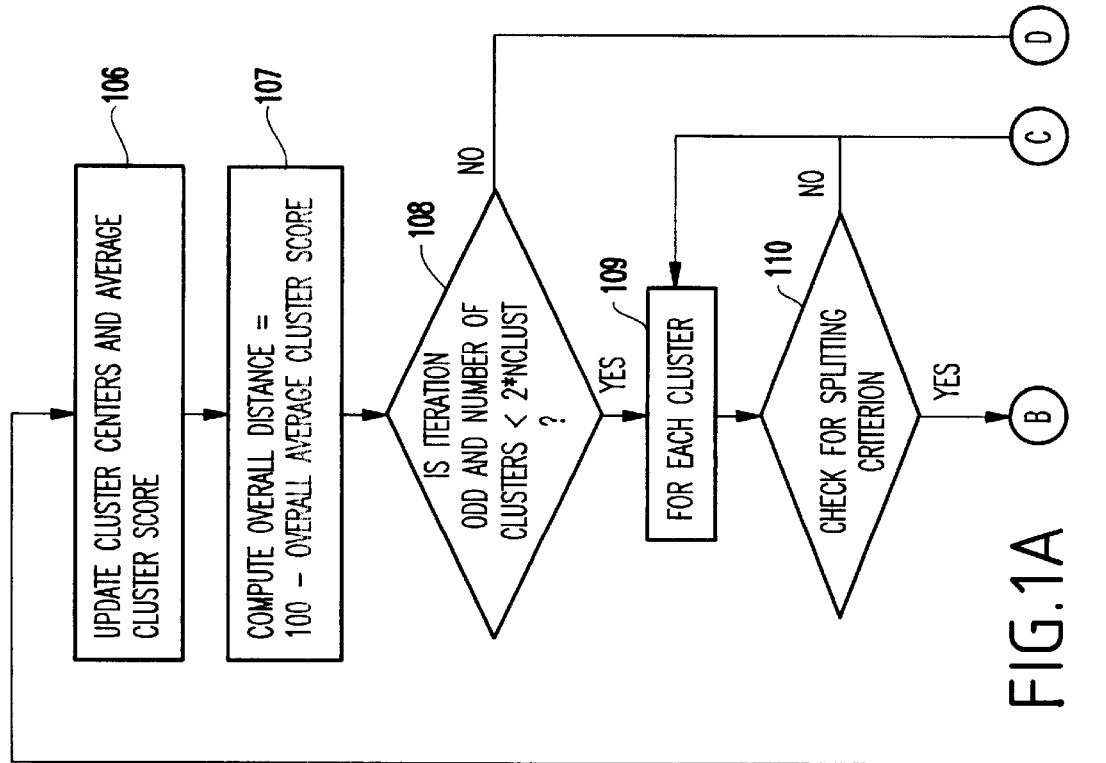
FIGS. 1A–1B are flow diagrams illustrating a preferred method of the invention.
Figure 1A:
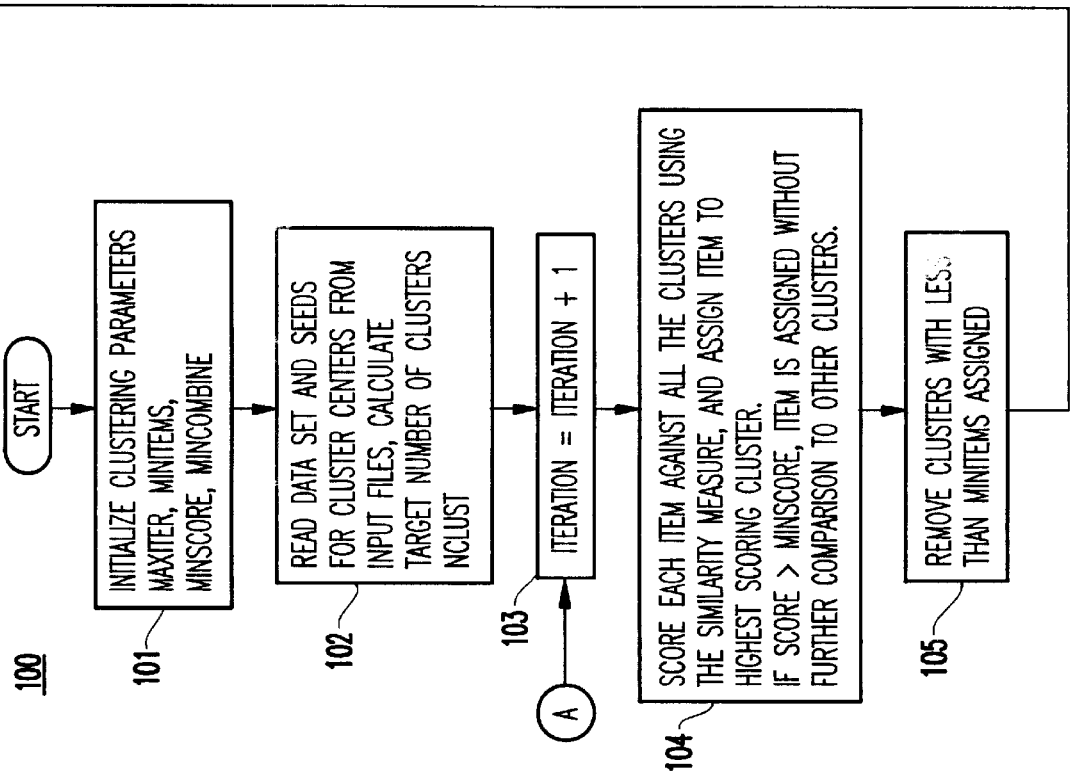
Figure 1B:
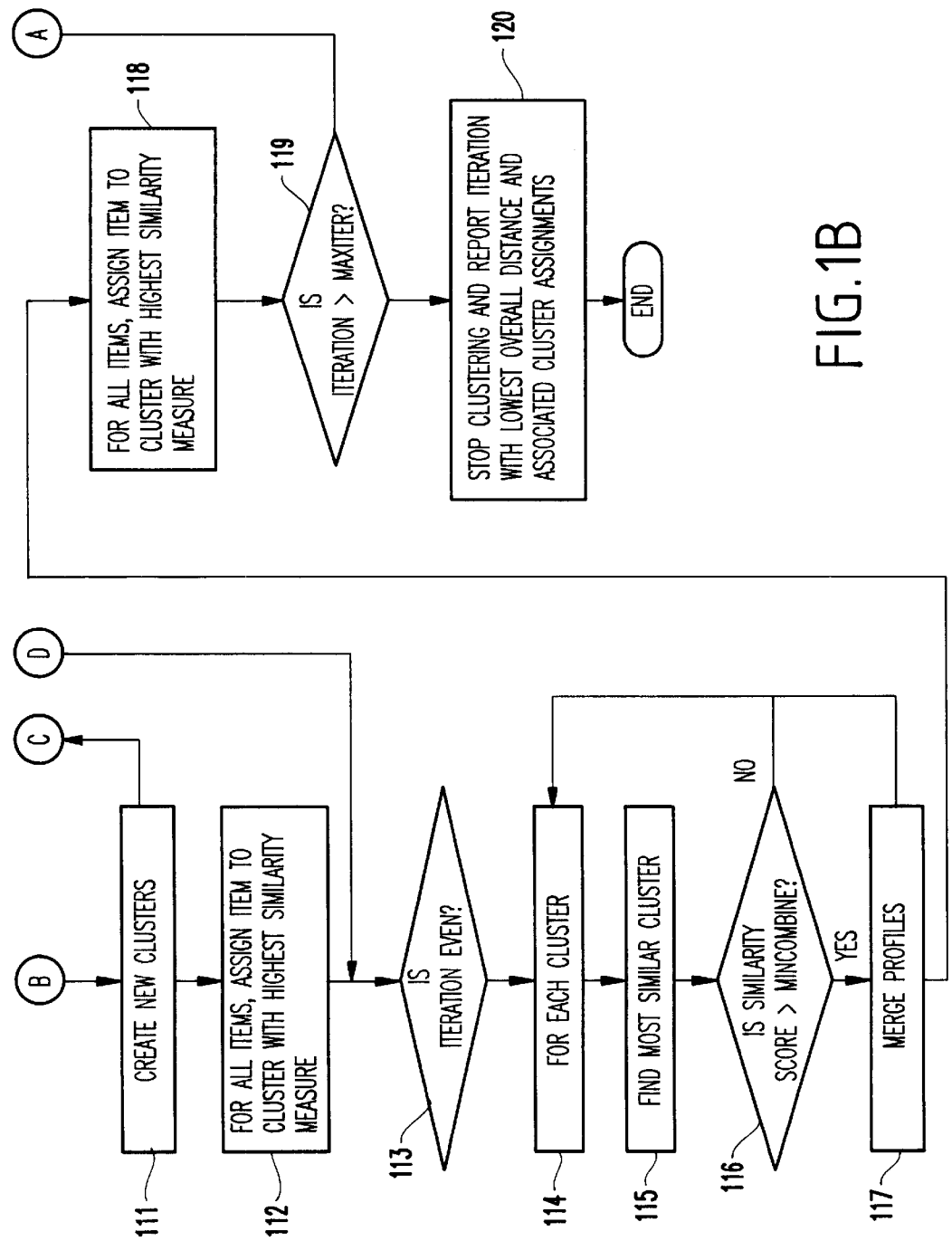

Referring now to the drawings, and more particularly to FIGS. 1A–1B, a first preferred embodiment of the method of the present invention is illustrated.

Generally, as mentioned above, the present invention relates to a computer-implemented method for clustering data points, and an exemplary implementation is described below regarding the retail environment. Specifically, in the exemplary implementation, the present invention provides a method for clustering retail sales data, and in greater detail a method which assumes a model of retail demand as a function of, for example, the price, base sales rate, and seasonal factors of the retail items, and clusters together retail items that have the same seasonal and price effect factors based on the model fit.

Figure 5A:
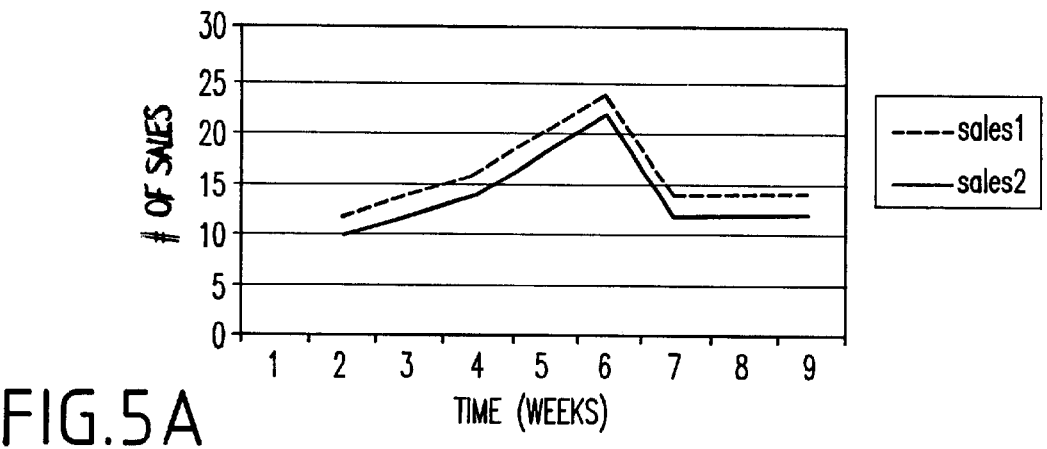
FIG. 5A is a graph of first and second items with similar sales patterns over time.

As mentioned above, in contrast to looking only at the sales data as shown in FIG. 5A, the present invention considers other independent variables (e.g., such as, for example, in the retail environment, the price of sale for the items), and thus when a model relating the sales to the price is assumed, then differing seasonal patterns and differing price sensitivities are shown for the different items. Thus, looking at only one variable may lead to an erroneous decision to cluster data, whereas in the invention by relating the independent variables with the dependent variables, a truer, more reliable determination may be made as to whether to cluster first and second data points and groups.

Figure 5B:
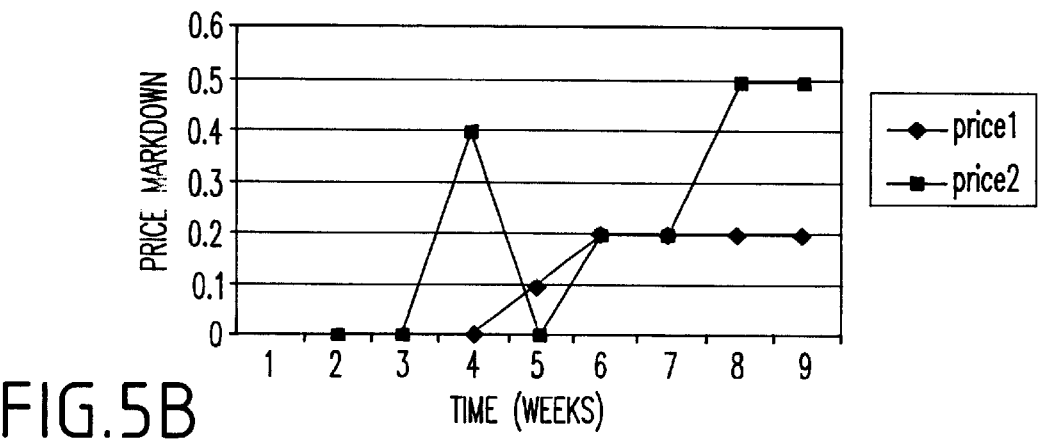
FIG. 5B is a graph illustrating the items' sale price data over time.
Figure 5C:
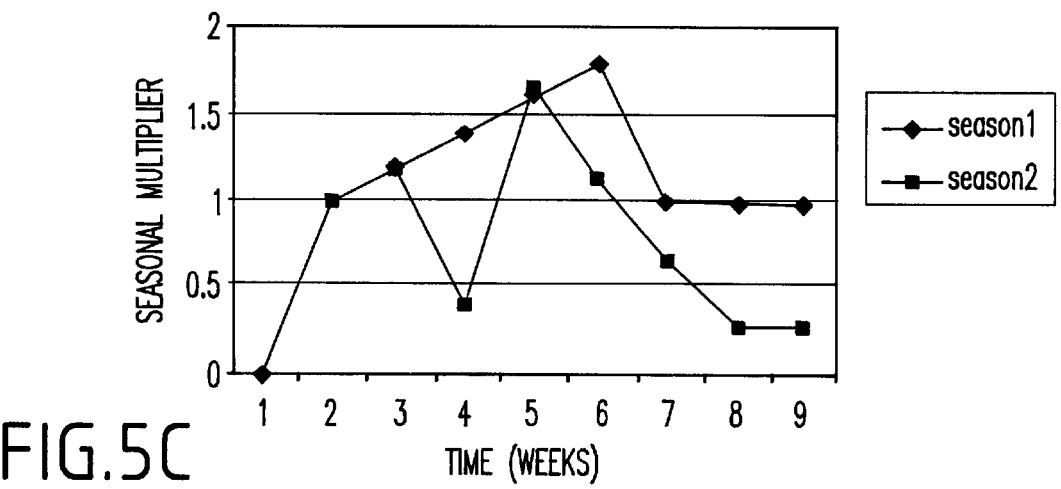
FIG. 5C illustrates the different seasonal pattern for the items, when combined with their sale price data (FIG. 5B), reveals different seasonal patterns (FIG. 5C) (e.g., when an independent variable is considered with dependent variables).

FIG. 5C illustrates a graph revealing different seasonal patterns and different price sensitivities. The seasonal effects (e.g., multiplier) is seen along the Y axis and time (e.g., weeks, months, etc.) is shown along the X axis. Also shown is the price effect and price sensitivity factor. In the example, item 1 has a price sensitivity factor of 1 (e.g., a 10.5% increase for a 10% increase in markdown) and item 2 shows a price sensitivity factor of 3 (e.g., a 35% increase for a 10% increase in markdown). Thus, as shown the results of combining the sales data (FIG. 5A) with the sale price data (FIG. 5B) reveal different seasonal patterns (e.g., possibly due to traditional buying seasons, etc.), resulting in a more reliable determination as whether to group or cluster such data. In the case at hand, since the results are very different, a determination would likely be made not to cluster or group the data points.

Thus, as mentioned above, while conventional clustering techniques use only one stream of data (e.g., such as the sales data over time) and may thus classify items 1 and 2 as similar, the inventive model-based clustering approach uses a model to relate multiple streams of data (sales and price over time in the above example) and clusters or classifies only on the basis of similarity in terms of model effects.

As mentioned above, while the exemplary implementation has been directed to the retail industry, other applications, such as financial market data, social science data, etc. would find equal benefit with the invention.

Moreover, the method of the present invention differs from the conventional techniques in that the inventive method assumes a model to describe the relations between the observed attributes of each entity (item). In one exemplary implementation, observed sales and price data over a given time period are assumed to be related by a model of the form $$Y = A e^{\gamma m} e^{\beta} \epsilon \qquad (1)$$

where
Y=observed sales,
m=observed markdown (m=((regular price−observed price)/regular price), where regular price is a given constant); and the parameters include:
γ: Price sensitivity;
β: Seasonal index for the given time period; and
ε: Error term−ln(ε) is assumed to be normally distributed with mean 0, variance $\sigma^2$.

Using this model, the following measures of distance, similarity, and compactness are defined below.

Similarity Measure Between Two Entities

The similarity measure between two entities (e.g., each having n periods of sales and markdown observations) is calculated as follows.

First, the two data sets are appended together and a least square regression fit for the assumed model form (e.g., Equation 1 above) is made using the logarithm of the observed sales data and the markdown data.

If the data sets have n entries each, then the model being fitted in the log space is lnY=lnA+γM+β+lnε, where Y is a vector of size 2n, A is a matrix of $[a_1, a_2]$ (e.g., $a_1$ being the base sale for data set 1 and $a_2$ being the base sale for data set 2 in log space, and base sale being the sales with no markdowns or seasonal effects (i.e., m and β=0), m is the corresponding vector of markdowns, γ is the shared price sensitivity factor, and β is the vector of n shared seasonal indices. All data with observed values of zero (i.e., Y=0) are ignored for this purpose.

Then, the adjusted regression coefficient $R^2$ obtained from the fit is used as the basis for the similarity measure.

For clarity, $R^2$ is defined as $1-SSE/SS_{yy}$, where $SS_{yy}=\Sigma(y_i-\bar{y})^2$, with $\bar{y}$ being the mean of all the observations of y. $SSE=\Sigma(y_i-\hat{y})^2$, where $\hat{y}$ is the predicted value of y, based on the least square model fit. Adjusted $R^2=1-(1-R^2)*(n-1)/(n-1-c)$, where n is the number of observations, and c is the number of coefficients estimated.

Then, the value 100* $R^2$ is used as the similarity measure between the two data sets.

Cluster Centers and Compactness of Clusters

To determine the cluster centers and compactness of clusters, first the data sets corresponding to all the entities assigned to a cluster are appended together and a least square regression is done.

If there are m entities with n data elements each, then the model fitted in the log space is lnY=lnA+γM+β+lnε, where Y is a vector of size mn, A is a matrix of $[a_1, a_2 \ldots a_m]$ ($a_1$ being the base sale for data set 1 and $a_m$ for data set m), M is the corresponding vector of markdowns, γ is the shared price sensitivity factor, and β is the vector of n shared seasonal indices. Once again, all data with observed values of sales being zero is ignored for this purpose.

Thereafter, adjusted $R^2=1-(1-R^2)*(n-1)/(n-1-c)$, where n is the number of observations, and c is the number of coefficients estimated. This $R^2$ is used as a measure of the "compactness" of the cluster or the average cluster score.

Then, the array [γ, β] is used to define the cluster center. Alternatively, each element of the cluster is scored against the center (e.g., the similarity measure between the element and the center is calculated), and the item with the highest measure is used as the center (e.g., designated as the center).

Similarity Measure Between Two Clusters

Each element of each cluster is scored against the center (e.g., the similarity measure between the element and the center is calculated), and the item with the highest measure is used as the center.

Then, the similarity measure between the centers of two clusters is calculated as described above in the manner of determining a similarity measure between two entities.

Distance

Then, distance is calculated. Distance is defined to be (100−similarity measure) for all cases. The distance could be between two entities or two clusters.

First Preferred Embodiment of Clustering Method

Using these measures, a clustering scheme based on the K-Mean and K-Median approaches (e.g., see Kaufman et al. "Finding Groups in Data—An Introduction to Cluster Analysis" John Wiley & Sons, 1990) has been implemented and tested. The flow chart of a preferred implementation is shown in FIGS. 1A–1B and as described below.

Turning to FIG. 1A, a clustering method 100 is shown.

First, in step 101, initialization of the clustering parameters is performed. Initialization includes reading in user-input values for the parameters such as MAXITER (e.g., the maximum number of clustering iterations to be done), MINITEMS (e.g., the minimum number of items needed to form a cluster), MINSCORE (e.g., the minimum score needed to stop searching and assign an item to a cluster), and MINCOMBINE (e.g., the minimum score needed to combine two clusters). Other variables such as Iteration are also initialized to zero, and the dimensions of arrays used to read in the data set are initialized. The variables can be freely set and defined by the designer.

In step 102, the actual data set used for clustering is read-in from input files, and the cluster center seeds (e.g., user-input) also are read. These seeds are used as the initial cluster centers. Given the number of elements, a calculation of the target number of clusters (e.g., NCLUST) is also made using standard methods available. For example, the number of clusters (NCLUST) is either input or calculated using a heuristic method, (e.g., NCLUST=Min (N, $0.375*N/(\log N)^2$)).

In step 103, the iteration counter is incremented.

In step 104, each item in the data set is scored against all the available cluster centers using the similarity measure method detailed above.

If the similarity measure value (e.g., of the item being examined) is greater than MINSCORE, no further search is performed for the item, and it is assigned to the particular cluster without any further comparison to other clusters. Otherwise, the item is assigned to the cluster against which the item scores the highest.

In step 105, clusters with very few assigned items (e.g., less than MINITEMS) are removed, and the items now remain unassigned.

In step 106, cluster centers are updated for all the remaining clusters and averaging the cluster score. This updating is performed by executing the method specified above in the description of the determination of clusters centers and compactness of clusters.

In step 107, the overall distance is computed. Specifically, an average cluster score is computed as the average of all the average cluster scores. Overall distance is then=100−overall average cluster score. The overall distance is used as a measure of the goodness (e.g., fitness) of all the clusters obtained in an iteration and is recorded for each iteration performed.

In step 108, it is determined whether the iteration is an odd-numbered iteration. If it is determined that the iteration is an odd-numbered iteration and that the remaining number of clusters is less than twice the target number calculated (e.g., *NCLUST) (e.g., a "YES" in step 108), then for each cluster a check of the splitting criterion is performed (e.g., steps 109 and 110), as described below.

For example, based on steps 108–110, if 100−average cluster score>overall distance, and the cluster has more than twice the minimum number of items needed (e.g., MINITEMS), then the cluster is considered a candidate for splitting and the process proceeds to step 111.

Turning to FIG. 1B and step 111, the item which scores the least (e.g., the lowest similarity measure) against the cluster center is used as the seed for the new cluster that is formed.

In step 112, an assignment of all items to clusters is performed using the similarity measure calculation (e.g., similar to step 104 above). Specifically, for all items, assign the item to a cluster with the highest similarity measure.

In step 113, it is determined whether the iteration is an even-numbered iteration.

For even-numbered iterations, instead of splitting clusters, joining of clusters is attempted (e.g., see steps 114 and 115). Specifically, each cluster is scored against the other using the method specified above in the description of finding the similarity between two clusters, and for each cluster a most similar cluster is found.

In step 116, the similarity measure is checked against MINCOMBINE. In step 117, if the similarity score is higher, then that pair of clusters are combined into one cluster by using any one of the centers, and destroying the other cluster. Thus, the profiles are merged.

In step 118, an assignment of all items to clusters as in step 104 is performed.

In step 119, the iteration number is checked against MAXITER. If the iteration number is less than MAXITER, then the process loops to step 103, and the sequence is repeated.

If in step 119, it is determined that the iteration is greater than MAXITER, then the process continues to step 120 and the procedure terminates. The iteration with the lowest overall distance is picked as the best, and the corresponding assignments of items to clusters, and the cluster scores and parameter estimates are used as the solution.

As described above, with the computer-implemented method of the invention, retail sales data can be clustered, and the method assumes a model of retail demand as a function of, for example, the price, base sales rate, and seasonal factors of the retail items. Thus, retail items that have the same seasonal and price effect factors can be clustered based on the model fit.

In contrast to the conventional techniques, the inventive method assumes a model to describe the relations between the observed attributes of each entity.

Further, the method of the present invention provides a model relating the independent and dependent variables, and provides a grouping which is not restricted and not based only on observed sales data. Finally, the invention can, for example, in a retail environment, separate items on the basis of price effects on demand.

The present invention may be implemented on a variety of different hardware platforms in a variety of different software environments.

Figure 2:
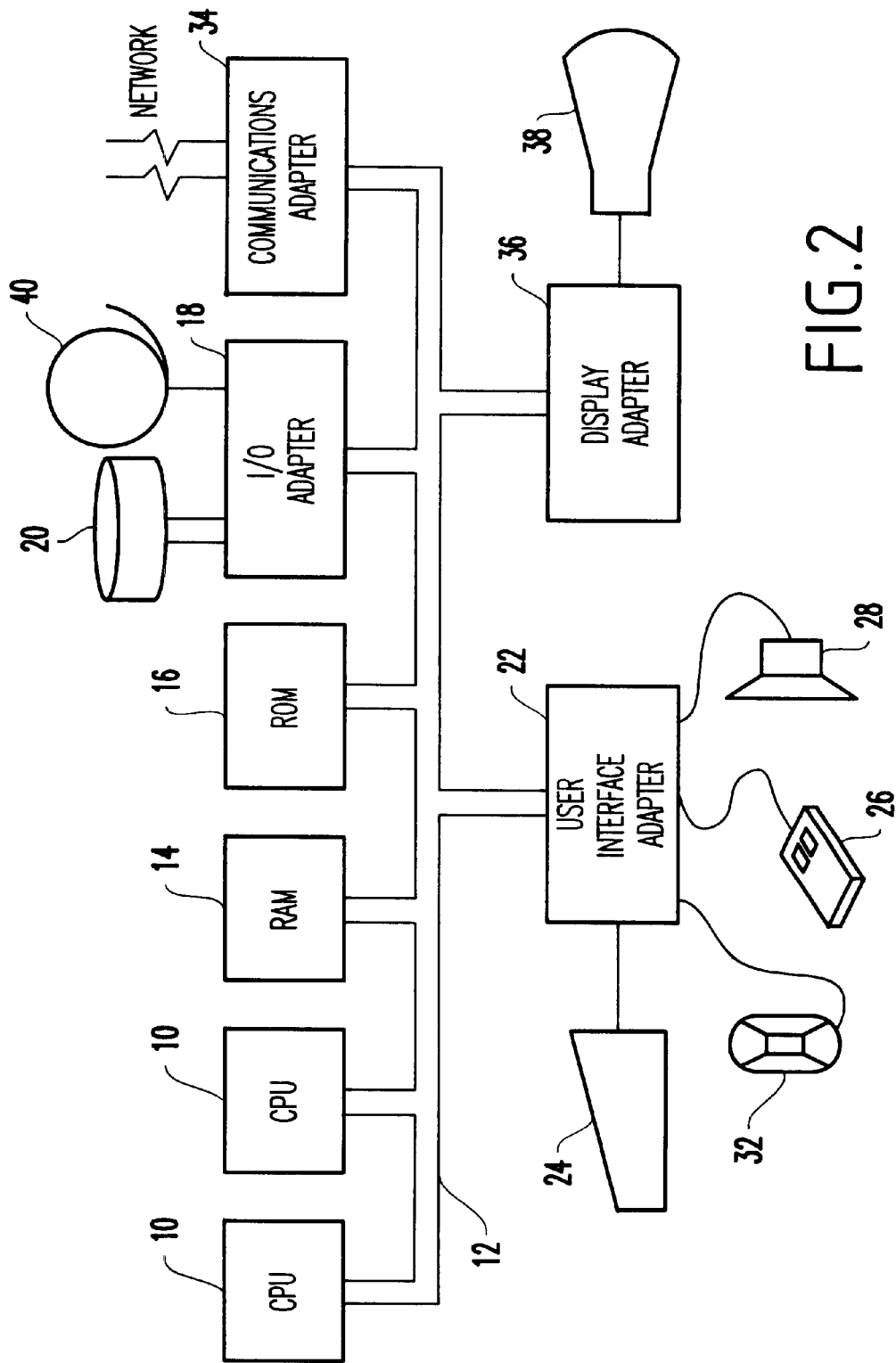
FIG. 2 illustrates an exemplary hardware platform for use with the method of the present invention illustrated in FIGS. 1A–1B and more specifically a schematic illustration of a computer system used with the invention.

A representative hardware environment for practicing the present invention is depicted in FIG. 2, which illustrates the typical hardware configuration of an information handling/computer system in accordance with the subject invention having at least one processor or central processing unit (CPU) 10. CPUs 10 are interconnected via system bus 12 to a random access memory (RAM) 14, read-only memory (ROM) 16, an input/output (I/O) adapter 18 for connecting peripheral devices such as disk units 20 and tape drives 40 to bus 12, user interface adapter 22 for connecting keyboard 24, mouse 26, speaker 28, microphone 32, and/or other user interface devices such as touch screen device (not shown) to bus 12, communication adapter 34 for connecting the information handling system to a data processing network, and display adapter 36 for connecting bus 12 to display device 38.

In addition to the hardware environment described above, a different aspect of the invention includes a computer-implemented method for model-based clustering. As an example, this method may be implemented in the particular hardware environment discussed above.

Figure 3:
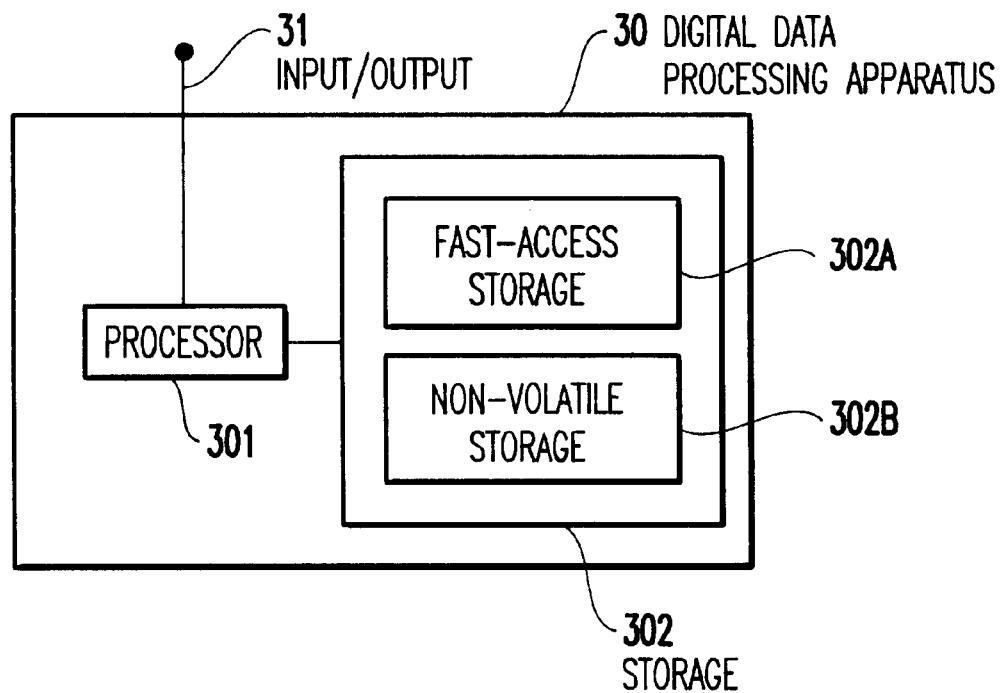
FIG. 3 illustrates a digital data processing apparatus for using the method of the invention.
Figure 4:
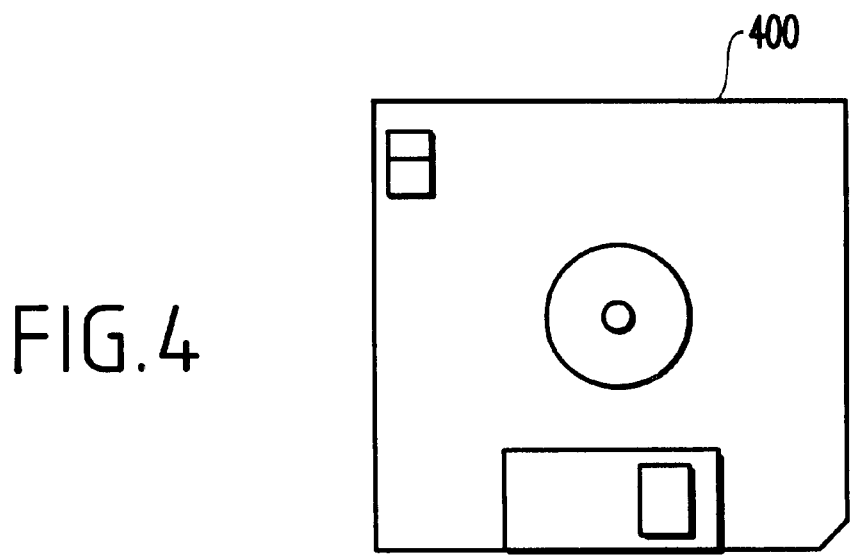
FIG. 4 illustrates a computer program product for storing the inventive program steps of the method of FIGS. 1A–1B.

Such a method may be implemented, for example, by operating the computer system/processor 10 (FIG. 2), as embodied by a digital data processing apparatus 30 (FIG. 3), to execute a sequence of machine-readable instructions. These instructions may reside in various types of signal-bearing media.

Thus, this aspect of the present invention is directed to a programmed product, comprising signal-bearing media tangibly embodying a program of machine-readable instructions executable by a digital data processor to perform a method of model-based clustering.

This signal-bearing media may include, for example, a RAM (not shown) contained within the processor 10, as represented by the fast-access storage 302A for example. Alternatively, the instructions may be contained in another signal-bearing media, such as a magnetic data storage diskette 400, as shown in FIG. 5, directly or indirectly accessible by the processor 10.

Whether contained in the diskette 400, the computer/processor 10, or elsewhere, the instructions may be stored on a variety of machine-readable data storage media, such as DASD storage (e.g., a conventional "hard drive" or a RAID array)! magnetic tape, electronic read-only memory (e.g., ROM, EPROM, or EEPROM), an optical storage device (e.g. CD-ROM, WORM, DVD, digital optical tape, etc.), paper "punch" cards, or other suitable signal-bearing media including transmission media such as digital and analog and communication links and wireless. In an illustrative embodiment of the invention, the machine-readable instructions may comprise software object code, compiled from a language such as "C", etc.

While the invention has been described in terms of preferred embodiments, those skilled in the art will recognize that the invention can be practiced with modification within the spirit and scope of the appended claims.

What is claimed is:

1. A method of grouping multiple data points, each data point being a set comprising a measured dependent value and at least one related independent variable value, comprising:

fitting the data points into a model relating the independent and dependent variables of the data points;

calculating similarity and distance between said data points and groups of said data points; and based on calculated similarity and distance, determining whether to group the multiple data points.

2. The method according to claim 1, wherein said calculating similarity between first and second data points includes:

appending two data sets together and performing a least square regression fit for an assumed model form using the logarithm of observed sales data and markdown data, wherein if the data sets have n entries each, then the model being fitted in the log space is $\ln Y = \ln A + \gamma m + \beta + \ln \epsilon$, where Y is a vector of size 2n, A is a matrix of $[a_1\ a_2]$, where $a_1$ is a base sale for data set 1 and $a_2$ is a base sale for data set 2, m is a corresponding vector of markdowns, $\gamma$ is a shared price sensitivity factor, and $\beta$ is a vector of n shared seasonal indices;

using an adjusted regression coefficient $R^2$ obtained from the fit for the similarity measure, wherein $R^2$ is defined as $1-SSE/SS_{yy}$, where $SS_{yy}=\Sigma(y_i-\bar{y})^2$, y being a mean of all observations of y, and $SSE=\Sigma(y_i-\hat{y})^2$, where $\hat{y}$ is a predicted value of y, based on the least square model fit, and adjusted $R^2=1-(1-R^2)*(n-1)/(n-1-c)$, where n is a number of observations, and c is a number of coefficients estimated; and using a value $100* R^2$ as the similarity measure between the two data sets.

3. The method according to claim 1, further comprising determining centers of groups of said data points.

4. The method according to claim 3, wherein said determining said centers of said groups includes:

appending together the data sets corresponding to all the entities assigned to a group, and performing a least square regression;

assuming m entities with n data elements each, using a model fitted in log space of $\ln Y = \ln A + \gamma M + \beta + \ln \epsilon$, where Y is a vector of size mn, A is a matrix of $[a_1\ a_2 \ldots a_m]$, with $a_1$ being a base sale for data set 1 and $a_m$ being a base sale for data set m, M is a corresponding vector of markdowns, $\gamma$ is a shared price sensitivity factor, and $\beta$ is a vector of n shared seasonal indices;

determining $R^2=1-(1-R^2)*(n-1)/(n-1-c)$, where n is a number of observations, and c is a number of coefficients estimated, as a measure of average group score; and determining the similarity measure between the element and the center by one of using an array $[\beta, \gamma]$ to define the group center, and scoring each element of the group against the center, such that the element with the highest measure is designated as the center.

5. The method according to claim 3, wherein said calculating a similarity measure between first and second groups of data points, includes:

scoring each element of each group against the center thereof by finding the similarity measure between the element and the center, and using the element with the highest measure as the center; and calculating the similarity measure between the centers of two groups.

6. The method according to claim 1, wherein a distance between groups is determined by 100-the similarity measure.

7. A system for grouping multiple data points, each data point being a set comprising a measured dependent value and at least one related independent variable value, comprising:

means for fitting the data into a model relating the independent and dependent variables of the data;

means for calculating similarity and distance between said data points and groups of said data points; and means for determining, based on calculated similarity and distance, whether to group the multiple data points.

8. The system according to claim 7, wherein said means for calculating said similarity measure between first and second data points includes:

means for appending two data sets together and performing a least square regression fit for an assumed model form using the logarithm of observed sales data and markdown data, wherein if the data sets have n entries each, then the model being fitted in the log space is $\ln Y = \ln A + \gamma m + \beta + \ln \epsilon$, where Y is a vector of size 2n, A is a matrix of $[a_1\ a_2]$, where $a_1$ is a base sale for data set 1 and $a_2$ is a base sale for data set.2, m is a corresponding vector of markdowns, $\gamma$ is a shared price sensitivity factor, and $\beta$ is a vector of n shared seasonal indices;

means for using an adjusted regression coefficient $R^2$ obtained from the fit for the similarity measure, wherein $R^2$ is defined as $1-SSE/SS_{yy}$, where $SS_{yy}=\Sigma(y_i-\bar{y})^2$, y being a mean of all observations of y, and $SSE=\Sigma(y_i-\hat{y})^2$, where $\hat{y}$ is a predicted value of y, based on the least square model fit, and adjusted $R^2=1-(1-R^2)*(n-1)/(n-1-c)$, where n is a number of observations, and c is a number of coefficients estimated; and means for using a value $100* R^2$ is used as the similarity measure between the two data sets.

9. The system according to claim 7, further comprising means for determining centers of groups of said data points.

10. The system according to claim 9, wherein said means for calculating said centers of said groups includes:

means for appending together the data sets corresponding to all the entities assigned to a cluster, and performing a least square regression;

assuming m entities with n data elements each, means for using a model fitted in log space of in $\ln Y=\ln A+\gamma M+\beta+\ln\epsilon$, where Y is a vector of size mn, A is a matrix of $[a_1\ a_2\ \ldots\ a_m]$, with $a_1$ being a base sale for data set 1 and $a_m$ being a base sale for data set m, M is a corresponding vector of markdowns, $\gamma$ is a shared price sensitivity factor, and $\beta$ is a vector of n shared seasonal indices;

means for determining $R^2=1-(1-R^2)*(n-1)/(n-1-c)$, where n is a number of observations, and c is a number of coefficients estimated, as a measure of average group score; and means for determining the similarity measure between the element and the center by one of using an array $[\beta,\gamma]$ to define the group center, and scoring each element of the group against the center, such that the element with the highest measure is designated as the center.

11. The system according to claim 7, wherein said means for calculating a similarity measure between first and second groups of data points, includes:

means for scoring each element of each group against the center thereof by finding the similarity measure between the element and the center, and using the element with the highest measure as the center; and means for calculating the similarity measure between the centers of two groups.

12. The system according to claim 7, wherein a distance between groups is determined by 100–the similarity measure.

13. A signal-bearing medium tangibly embodying a program of machine-readable instructions executable by a digital processing apparatus to perform a method for computer-implemented model-based grouping of multiple data points, each data point being a set comprising a measured dependent value and at least one related independent variable value, said method comprising:

fitting the data into a model relating the independent and dependent variables of the data;

calculating similarity and distance between said data points and groups of said data points; and based on calculated similarity and distance, determining whether to group the multiple data points.

14. The signal-bearing medium according to claim 13, wherein said determining said similarity measure between first and second data points includes:

appending two data sets together and performing a least square regression fit for an assumed model form using the logarithm of observed sales data and markdown data, wherein if the data sets have n entries each, then the model being fitted in the log space is $\ln Y=\ln A+\gamma m+\beta+\ln\epsilon$, where Y is a vector of size 2n, A is a matrix of $[a_1\ a_2]$, where $a_1$ is a base sale for data set 1 and $a_2$ is a base sale for data set 2, m is a corresponding vector of markdowns, $\gamma$ is a shared price sensitivity factor, and $\beta$ is a vector of n shared seasonal indices;

using an adjusted regression coefficient $R^2$ obtained from the fit for the similarity measure, wherein $R^2$ is defined as $1-SSE/SS_{yy}$, where $SS_{yy}=\Sigma(y_i-\bar{y})^2$, y being a mean of all observations of y, and $SSE=\Sigma(y_i-\hat{y})^2$, where $\hat{y}$ is a predicted value of y, based on the least square model fit, and adjusted $R^2=1-(1-R^2)*(n-1)/(n-1-c)$, where n is a number of observations, and c is a number of coefficients estimated; and using the value $100*R^2$ as the similarity measure between the two data sets.

15. The signal-bearing medium according to claim 13, further comprising determining centers of groups of said data points.

16. The signal-bearing medium according to claim 15, wherein said determining said centers of said groups includes:

appending together the data sets corresponding to all entities assigned to a cluster, and performing a least square regression;

assuming m entities with n data elements each, using a model fitted in log space of $\ln Y=\ln A+\gamma M+\beta+\ln\epsilon$, where Y is a vector of size mn, A is a matrix of $[a_1\ a_2\ \ldots\ a_m]$, with $a_1$ being a base sale for data set 1 and $a_m$ being a base sale for data set m, M is a corresponding vector of markdowns, $\gamma$ is a shared price sensitivity factor, and $\beta$ is a vector of n shared seasonal indices;

determining $R^2=1-(1-R^2)*(n-1)/(n-1-c)$, where n is a number of observations, and c is a number of coefficients estimated, as a measure of average group score; and determining the similarity measure between the element and the center by one of using an array $[\beta,\gamma]$ to define the group center, and scoring each element of the group against the center, such that the element with the highest measure is designated as the center.

17. The signal-bearing medium according to claim 15, wherein said calculating a similarity measure between first and second groups of data points, includes:

scoring each element of each group against the center thereof by finding the similarity measure between the element and the center, and using the element with the highest measure as the center; and calculating the similarity measure between the centers of two groups.

18. The signal-bearing medium according to claim 13, wherein a distance between groups is determined by 100–the similarity measure.

19. A method of model-based clustering, comprising:

initializing clustering parameters for a plurality of items;

providing a data set for clustering, and cluster center seeds, and calculating an target number of clusters;

incrementing an iteration counter;

scoring each item in the data set against all available cluster centers using a similarity measure process, wherein if a similarity measure value of the item being examined is greater than a minimum first parameter, no further search is performed for the item, and the item is assigned to a particular cluster, and when the similarity measure value is less than said minimum first parameter, the item is assigned to the cluster against which the item scores the highest;

removing clusters having a predetermined low number of assigned items, said removed clusters including items which are unassigned;

updating cluster centers for all remaining clusters;

calculating an overall average cluster score as the average of all the average cluster scores to determine an overall distance, an overall distance being recorded for each iteration performed;

determining whether an iteration is an odd-numbered iteration, wherein if it is determined that the iteration is an odd numbered iteration and that the remaining number of clusters is less than twice the target number calculated, then for each cluster checking a splitting criterion; and determining whether a cluster is a candidate for splitting based on whether 100−average cluster score is greater than the overall distance, and whether the cluster has more than twice the minimum number of items needed, wherein an item which scores the least by having a lowest similarity measure against the cluster center is used as a seed for a new cluster to be formed.

20. The method according to claim 19, further comprising:

assigning all items to clusters using the similarity measure calculation;

determining whether the iteration is an even-numbered iteration, wherein for even-numbered iterations, joining of clusters is attempted, and each cluster is scored against another by using finding a similarity measure between two clusters, and for each cluster a most similar cluster is found;

checking the similarity measure against a parameter, wherein if the similarity score is higher, then that pair of clusters are combined into one cluster by using any one of the centers;

assigning all items to clusters based on said similarity measure; and checking the iteration number against a maximum iteration parameter, wherein if the iteration number is less than said maximum iteration parameter, the iteration number is incremented, and a sequence is repeated, and wherein if it is determined that the iteration is greater than the maximum iteration parameter, then the process terminates, wherein the iteration with the lowest overall distance is selected, and corresponding assignments of items to clusters, the cluster scores and parameter estimates are used.

21. The method according to claim 19, wherein said initializing comprises:

providing user-input values for the parameters including at least one of the maximum number of clustering iterations to be performed, the minimum number of items needed to form a cluster, the minimum score needed to stop searching and assign an item to a cluster, and the minimum score needed to combine two clusters; and initializing dimensions of arrays used to read the data set.

22. The method according to claim 19, wherein said cluster center seeds are used as initial cluster centers.

23. The method according to claim 19, wherein said method is applied to retail transactions, and wherein said determining said similarity measure between first and second entities includes:

appending two data sets together and performing a least square regression fit for an assumed model form using the logarithm of observed sales data and markdown data, wherein if the data sets have n entries each, then the model being fitted in the log space is $\ln Y = \ln A + \gamma m + \beta + \ln \epsilon$, where Y is a vector of size 2n, A is a matrix of $[a_1\ a_2]$, where $a_1$ is a base sale for data set 1 and $a_2$ is a base sale for data set 2, m is a corresponding vector of markdowns, $\gamma$ is a shared price sensitivity factor, and $\beta$ is a vector of n shared seasonal indices;

using an adjusted regression coefficient $R^2$ obtained from the fit for the similarity measure, wherein $R^2$ is defined as $1-SSE/SS_{yy}$, where $SS_{yy}=\Sigma(y_i-\bar{y})^2$, y being a mean of all observations of y, and $SSE=\Sigma(y_i-\hat{y})^2$, where $\hat{y}$ is a predicted value of y, based on the least square model fit, and adjusted $R^2=1-(1-R^2)*(n-1)/(n-1-c)$, where n is a number of observations, and c is a number of coefficients estimated; and using the value 100* $R^2$ as the similarity measure between the two data sets.

24. The method according to claim 19, wherein said updating cluster centers for remaining clusters includes:

appending together data sets corresponding to all the entities assigned to a cluster and performing a least square regression, wherein if there are m entities with n data elements each, then the model fitted in the log space is $\ln Y = \ln A + \gamma M + \beta + \ln \epsilon$, where Y is a vector of size mn, A is a matrix of $[a_1\ a_2 \ldots a_m]$, $a_1$ being a base sale for data set 1 and $a_m$ being a base sale for data set m), M is a corresponding vector of markdowns, $\gamma$ is a shared price sensitivity factor, and $\beta$ is a vector of n shared seasonal indices;

determining adjusted , $R^2=1-(1-R^2)*(n-1)/(n-1-c)$, where n is a number of observations, and c is a number of coefficients estimated, $R^2$ being one of a measure of compactness of the cluster and an average cluster score; and one of using an array $[\beta, \gamma]$ to define the cluster center, and scoring each element of the cluster against the center by determining a similarity measure between the element and the center, and selecting the item with the highest measure as the center.

25. The method according to claim 24, wherein said process of finding a similarity measure between first and second clusters, includes:

scoring each element of each cluster against the center by finding the similarity measure between the element and the center, and using the item with the highest measure as the center; and calculating the similarity measure between the centers of two clusters.

26. The method according to claim 19, wherein a distance between clusters is determined by 100−the similarity measure.

27. In a model-based clustering process for a plurality of data points, a method of determining a similarity measure between first and second data points of said plurality of data points includes:

appending two data sets together and performing a least square regression fit for an assumed model form using the logarithm of the observed sales data and the markdown data, wherein if the data sets have n entries each, then the model being fitted in the log space is $\ln Y = \ln A + \gamma m + \beta + \ln \epsilon$, where Y is a vector of size 2n, A is a matrix of $[a_1\ a_2]$, where $a_1$ is a base sale for data set 1 and $a_2$ is a base sale for data set 2, m is a corresponding vector of markdowns, $\gamma$ is a shared price sensitivity factor, and $\beta$ is a vector of n shared seasonal indices;

using an adjusted regression coefficient $R^2$ obtained from the fit for the similarity measure, wherein $R^2$ is defined as $1-SSE/SS_{yy}$, where $SS_{yy}=\Sigma(y_i-\bar{y})^2$, y being a mean of all the observations of y, and $SSE=\Sigma(y_i-\hat{y})^2$, where $\hat{y}$ is a predicted value of y, based on the least square model fit, and adjusted $R^2=1-(1-R^2)*(n-1)/(n-1-c)$, where n is a number of observations, and c is a number of coefficients estimated; and using the value 100* $R^2$ as the similarity measure between the two data sets.

28. In a model-based clustering process for a plurality of clusters of data, a method of calculating a similarity measure between first and second clusters of data, includes:

determining centers of each of said first and second clusters;

scoring each element of each cluster against a center by finding the similarity measure between the element and the center, and using the element with the highest measure as the center; and calculating the similarity measure between the centers of two clusters.

29. The method according to claim 28, wherein said determining said centers of said groups includes:

appending together the data sets corresponding to all the entities assigned to a cluster, and performing a least square regression;

assuming m entities with n data elements each, using a model fitted in log space of $\ln Y = \ln A + \gamma M + \beta + \ln \epsilon$, where Y is a vector of size mn, A is a matrix of $[a_1\ a_2\ \ldots\ a_m]$, with $a_1$ being a base sale for data set 1 and $a_m$ being a base sale for data set m, M is a corresponding vector of markdowns, $\gamma$ is a shared price sensitivity factor, and $\beta$ is a vector of n shared seasonal indices;

determining $R^2 = 1-(1-R^2)*(n-1)/(n-1-c)$, where n is a number of observations, and c is a number of coefficients estimated, as a measure of average cluster score; and determining the similarity measure between the element and the center by one of using an array $[\beta, \gamma]$ to define the cluster center, and scoring each element of the cluster against the center, such that the element with the highest measure is designated as the center.

30. The method according to claim 28, wherein a distance between clusters is determined by 100-the similarity measure.

31. The method according to claim 1, wherein said model is defined by $$Y = A e^{\gamma m} e^{\beta} \epsilon$$

where

Y=observed sales, m=observed markdown (m=((regular price−observed price)/regular price), where regular price is a given constant); and the parameters include:

$\gamma$: Price sensitivity;

$\beta$: Seasonal index for the given time period; and $\epsilon$: Error term−ln($\epsilon$) is assumed to be normally distributed with mean 0, variance $\sigma^2$.

* * * * *